W. E. MURRAY.
CHAR DISTRIBUTER.
APPLICATION FILED AUG. 17, 1912.

1,065,960.

Patented July 1, 1913.
2 SHEETS—SHEET 1.

WITNESSES

INVENTOR
Warren E. Murray
BY
ATTORNEY

W. E. MURRAY.
CHAR DISTRIBUTER.
APPLICATION FILED AUG. 17, 1912.

1,065,960.

Patented July 1, 1913.

2 SHEETS—SHEET 2.

UNITED STATES PATENT OFFICE.

WARREN E. MURRAY, OF SAN FRANCISCO, CALIFORNIA, ASSIGNOR TO WESTERN SUGAR REFINING COMPANY, OF SAN FRANCISCO, CALIFORNIA, A CORPORATION OF CALIFORNIA.

CHAR-DISTRIBUTER.

1,065,960.

Specification of Letters Patent.  Patented July 1, 1913.

Application filed August 17, 1912. Serial No. 715,640.

*To all whom it may concern:*

Be it known that I, WARREN E. MURRAY, a citizen of the United States, residing in the city and county of San Francisco and State of California, have invented certain new and useful Improvements in Char-Distributers, of which the following is a specification.

The hereinafter described invention relates to an improved means for uniformly delivering bone black or char to the char filter or filtering tanks used in sugar refineries for the filtration and decolorization of the liquid sugar, and the object thereof is to evenly distribute the bone black or char within the filtering tank in order to produce a uniform, evenly distributed and compact body or filtering bed therein.

Usually, the bone black or char is simply run into the open mouth of the filtering tanks until the same is full, with the result that the larger grains of the bone black or char run toward the outside or wall of the filter tank, leaving the fine dust in the center thereof. As the liquid solution is run into the filter tank the same flows along or follows the lines of least resistance, which is toward the larger grains of the filtering bed and working through the interstices thereof flows quickly downwardly toward the outlet of the filtering tank and escapes therefrom in a condition of partial filtration, only a small percentage of the liquid sugar working through the solid portion of the filtering bed as thus packed within the filter.

By the use of the hereinafter described invention the bone black or char is evenly distributed within the filtering tanks, so that a uniform bed of filtering material is provided throughout which the liquid sugar delivered into the filled tanks must work or percolate in its downward course, with the result that perfect filtration takes place and re-working or re-filtration of the liquid sugar is obviated.

To comprehend the invention reference should be had to the accompanying drawings, wherein—

Figure 1:
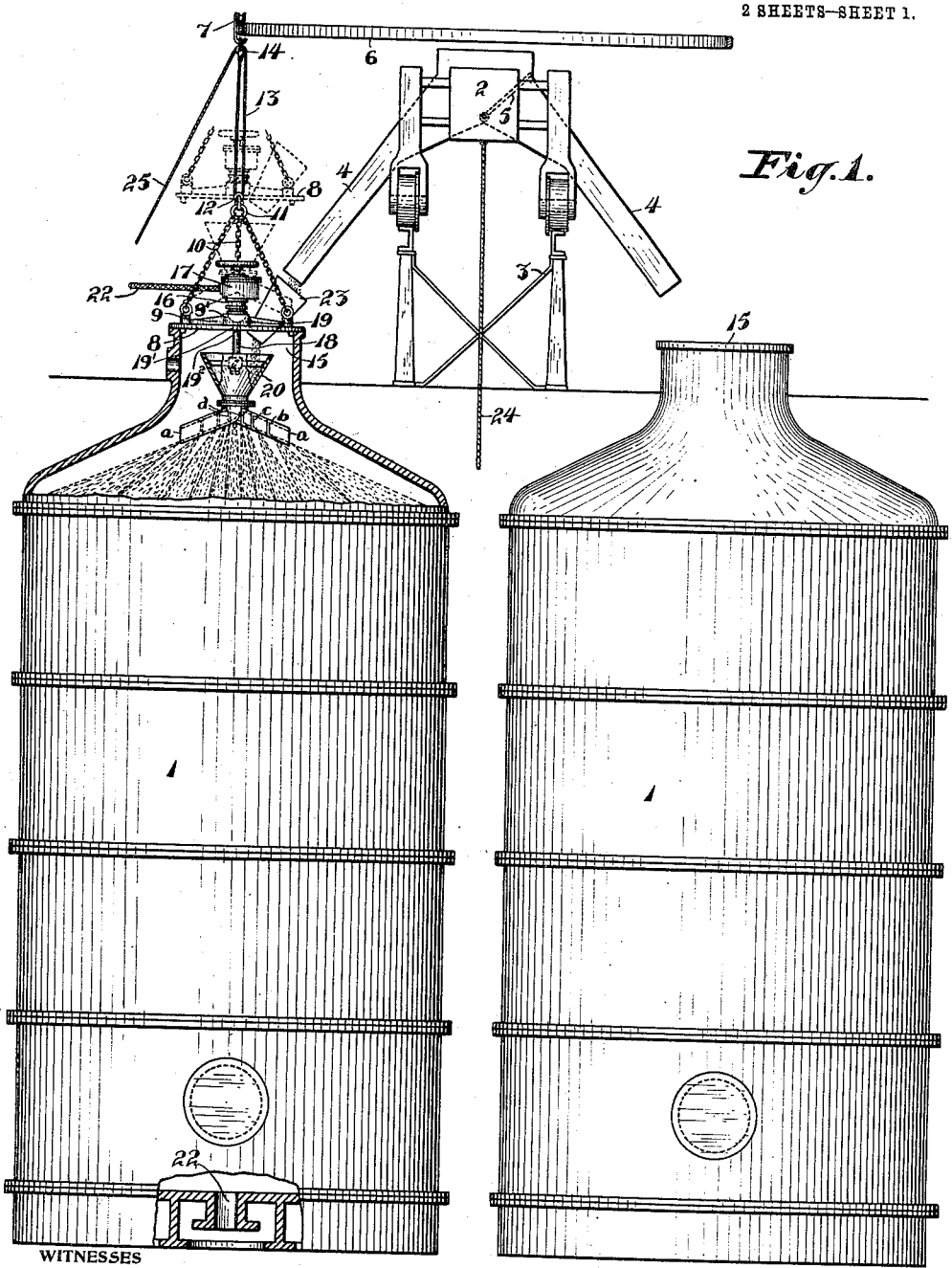
Figure 2:
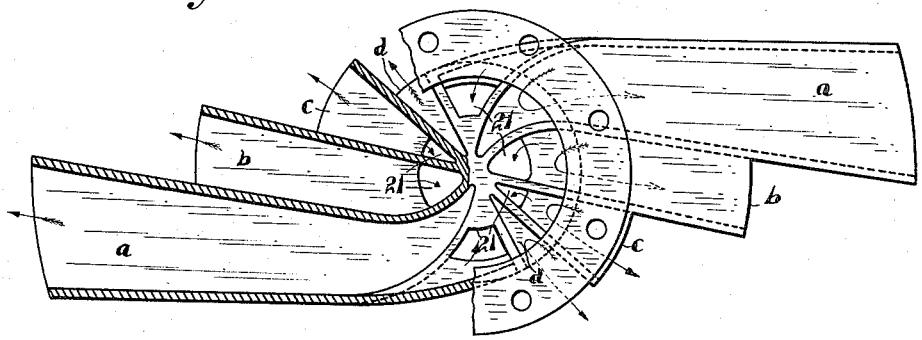
Figure 3:
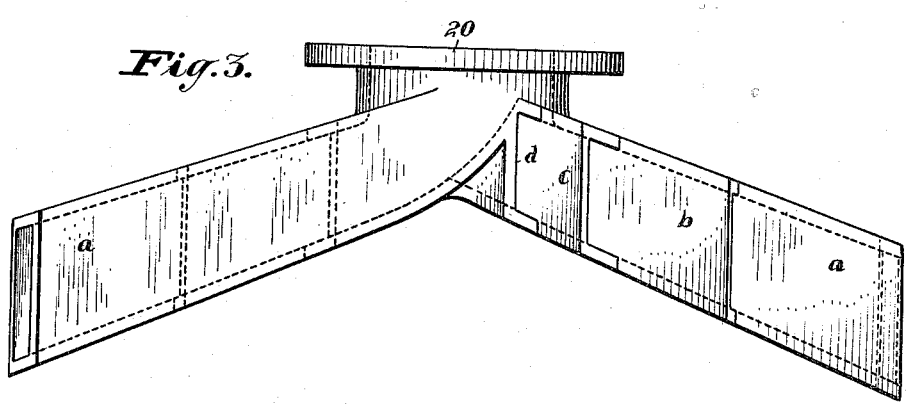
Figure 4:
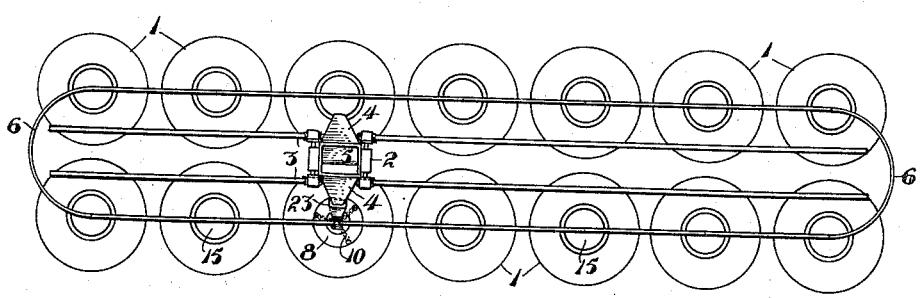

Figure 1 is an end elevation of the distributing means for the bone black or char positioned for the delivery of the material into the filtering tanks, the position of the distributer when removed from within the tank being disclosed in dotted lines. Fig. 2 is an enlarged plan view of the distributing head. Fig. 3 is a side elevation of the distributing head disclosed by Fig. 2 of the drawings. Fig. 4 is a top plan view of the longitudinally movable carrier and the encircling trackway for the crawl from which the rotary distributing means are suspended, the said view disclosing the arrangement of the filtering tanks relative to the distributing means.

In the drawings, the numeral 1 is used to indicate the filtering tank, usually arranged in parallel series, and above the tank and where the arrangement thereof is in parallel series intermediate the series is located a carrier 2, which is movable on an overhead longitudinally disposed frame structure 3. The carrier receives the bone black or char to be delivered into the filtering tanks, and from the said carrier extends the downwardly inclined discharge chutes 4, the flow of material therethrough being controlled by the outlet gate 5. Where a double series of filtering tanks are employed, as illustrated in the drawings, the carrier 2 is provided with two discharge chutes 4, one for each series of the said tanks.

Presuming there are two parallel spaced series of filtering tanks, the frame structure 3 is situated within the sphere of an encircling track 6, on which works a crawl 7, from which is suspended a cover plate 8 for the filter tanks 1. The said cover plate, in the present case, is united to a spider 9, connected by supporting chains 10 to a ring 11 connected to the lower block 12 of the differential 13, the upper block 14 of which is suspended from the overhead crawl 7. By means of the differential, the spider 9 is lowered and raised to place the cover plate 8 onto and off of the open mouth 15 of the filtering tanks 1, on the overhead crawl 7 being properly positioned relative to the said tank for this purpose.

The spider 9 supports a centrally disposed platform 16, on which is mounted an air or electric motor 17, the vertical shaft 18 of which is held within a bearing 19 and extends downwardly through a shaft opening 19′ in the cover plate 8, being projected a distance below the said plate. At its lower end the shaft 18 carries a hopper 20, from which spring a double series of radially extended involute hollow guide arms $a$, $b$, $c$, and $d$, of gradually reduced lengths, which receive the bone black or char from the rotary hopper 20 and by the generated centrifugal strains discharges the same within the filtering tanks to be filled. Within the bottom of the hopper intermediate the distributing guide arms are cored outlet holes 21 for the direct downward flow and central escape of the bone black or char from within the hopper, the same discharging through said openings and the hollow distributing arms into the filtering tank as jet streams, thereby producing a downward shower of the material into the filtering tank—Fig. 1 of the drawings. The material as thus delivered into the filtering tank gradually fills the same to the top thereof in an even bed, the fine and coarse grains of the bone black or char being evenly distributed, producing a filtering bed of uniform consistency throughout and one through the body of which the liquid sugar delivered into the filtering tank must percolate toward the outlet 22 of the tanks. Through the cover 8 extends a filling spout 23 which receives the bone black or char from the chute 4 and discharges the same into the hopper 20 for distribution between the arms—$a$, $b$, $c$, and $d$. In order to permit of a gyratory motion being imparted to the shaft 19 and the parts carried thereby, the lower spherical shaped end of the bearing 19 is seated within a semi-spherical seat $19^2$ in the hub $9'$ of the spider 9 which permits independent movement of the shaft and parts carried thereby relative to the cover 8.

In the present case the motor 16 is an ordinary type air motor, air under pressure for actuating the same being supplied by means of the air supply pipe 22 connected therewith and leading from a suitable source of supply. However, as stated, an electric motor may be utilized for imparting rotation to the shaft 18 and the parts carried thereby.

The carrier or container 2 for the bone black or char is moved along its supporting platform by any suitable means, as, for instance, a rope or cable 24 depending therefrom, and likewise by means of a rope or cable 25 depending to within convenient reach of an operator, the crawl 7 is moved along its track-way 6 for proper position relative to the carrier or container 2.

The operation of the apparatus may be briefly described as follows:—The crawl is first moved along its trackway until the distributing head is in a position directly over the open mouth of such tank, when the differential is operated to lower and apply the cover 8 to the mouth of said tank in order to place the hopper 20 and its distributing arms within the same. The carrier is then brought into a position opposite the crawl, so that its chute 4 will be immediately above the spout 23 of the cover 8. The gate 5 controlling the outlet of material from the carrier or container 2 through the chute 4 is then opened and at the same time the motor 17 is placed into operation for imparting rotation to the shaft 18 and the hopper 20 carried thereby. The bone black or char is discharged through the spout 23 into the hopper 20 and gradually working downwardly into the perforated arms $a$, $b$, $c$, and $d$, radially projected therefrom is discharged into the filtering tank in jet streams, also escaping through the holes or outlets 21 in the bottom of the hopper intermediate the said distributing arms. Inasmuch as the hopper 20 and the distributing arms are in rotation throughout the filling or charging operation of the filter tank, the bone black or char is discharged as a shower and evenly and uniformly distributed within the filter tank, the central banking of the same being provided against. After the tank has been filled to its proper height, the carrier or container is moved to place the chute 4 from within the sphere of the spout 23, and the differential operated to raise the cover 8 to remove the hopper and its distributing arms from within the filled tank and the crawl moved to properly position the hopper and distributing arms for the next tank to be filled, after which the carrier is positioned relative to the crawl and the before described filling operation continued. In case of a double series of spaced tanks, two of the tanks are filled simultaneously, there being for this purpose provided two crawls and associated parts.

By the use of the described invention the bone black or char is not only uniformly distributed and evenly deposited within the filtering tanks, but the work of filling the said tanks is materially expedited and simplified, dispensing with the necessity of operators being required to break down the cone usually formed by the bone black or char as at present deposited within the tanks in an effort to maintain the same level.

While I have illustrated the cover plate as independent of the spider and united thereto, such is merely for convenience and is in no manner essential, as it is obvious that the two may be formed as an integral structure, hence I do not wish to be understood as limiting myself in this manner.

Having thus described the invention what is claimed as new and desired to be protected by Letters Patent is:—

1. A distributer for the described purpose, the same comprising a longitudinally movable carrier for bone black or char, a longitudinally movable crawl, a vertically movable cover suspended therefrom, a rotary motor carried by the crawl, a shaft depending from the motor, a hopper provided with distributing arms secured to the lower end of the shaft for rotation therewith, and means for delivering bone black or char from the carrier into the said hopper.

2. A distributer for the described purpose, the same comprising a movable carrier for bone black or char, a crawl movable relatively to the carrier, a vertically movable spider suspended from the crawl, a motor supported by the spider, a shaft depending therefrom, a hopper provided with distributing arms secured to the lower end portion of the shaft and rotatable therewith, and means for delivering bone black or char from the carrier into the hopper.

3. An apparatus for the described purpose, the same comprising a movable carrier for the bone black or char, a crawl movable relatively to the carrier, a motor sustained by the crawl, a rotary distributer actuated by said motor, means for placing the rotary distributer into and out of a tank to be filled, and devices for delivering bone black or char from the carrier into the rotary distributer.

4. An apparatus for the described purpose, the same comprising a longitudinally movable carrier provided with a discharge chute, a crawl movable relatively to the carrier, a spider suspended from said crawl, a cover plate supported by the spider, a motor mounted on the spider, a shaft depending from the motor and projected through the cover plate, a hopper provided with distributing arms secured to the shaft and rotatable therewith, adjustable connection between the spider and the crawl for placing the distributing hopper into and out of the tank to be filled, and devices for delivering bone black or char from the carrier into the hopper.

5. In an apparatus for the described purpose, the combination with a movable crawl, of a cover plate, a flexible connection between the cover plate and the crawl, a motor supported by the said cover plate, a shaft depending therefrom, a hopper provided with distributing arms secured to and rotatable with said shaft, and means for delivering bone black or char into the said hopper.

6. An apparatus for the described purpose, the same comprising a longitudinally movable carrier for the bone black or char, a supporting structure on which the same is movably mounted, a discharge chute extended from the carrier, a track-way encircling the supporting structure for the carrier, a crawl mounted on said track-way, a differential depending therefrom, a spider and cover plate suspended therefrom, a motor mounted thereon, a shaft extended from the motor and projected below the cover plate, a hopper provided with distributing arms secured to and rotatable with the said shaft, and a spout projected through the cover plate for guiding the bone black or char delivered from the discharge chute of the carrier into the hopper.

In testimony whereof I have signed my name to this specification in the presence of two subscribing witnesses.

WARREN E. MURRAY.

Witnesses:
  HARRY A. TOTTEN,
  D. B. RICHARDS.